Sept. 30, 1958            D. BORZONE            2,854,019
APPARATUS FOR CONTROLLING THE INFLATION OF
MOTOR VEHICLE TIRES AT SERVICE STATIONS
Filed Nov. 15, 1954                              4 Sheets-Sheet 4
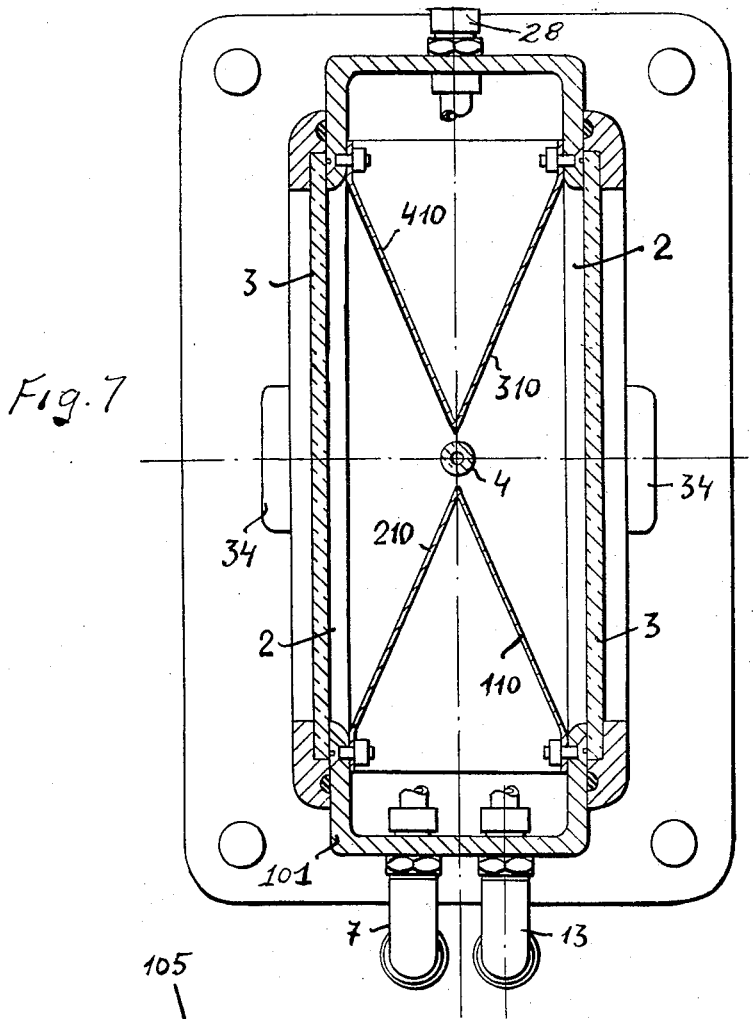
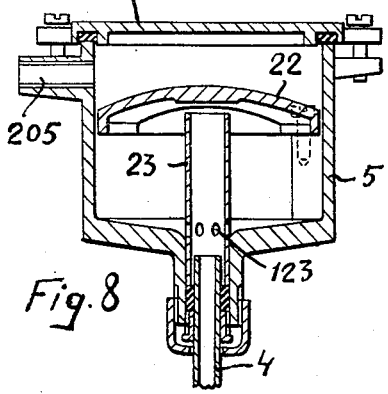
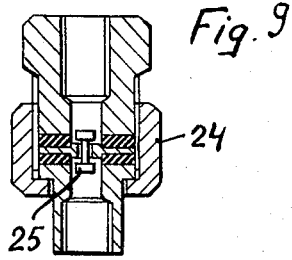
INVENTOR
DOMINGO BORZONE
BY Toulmin & Toulmin
ATTORNEYS

United States Patent Office 2,854,019
Patented Sept. 30, 1958

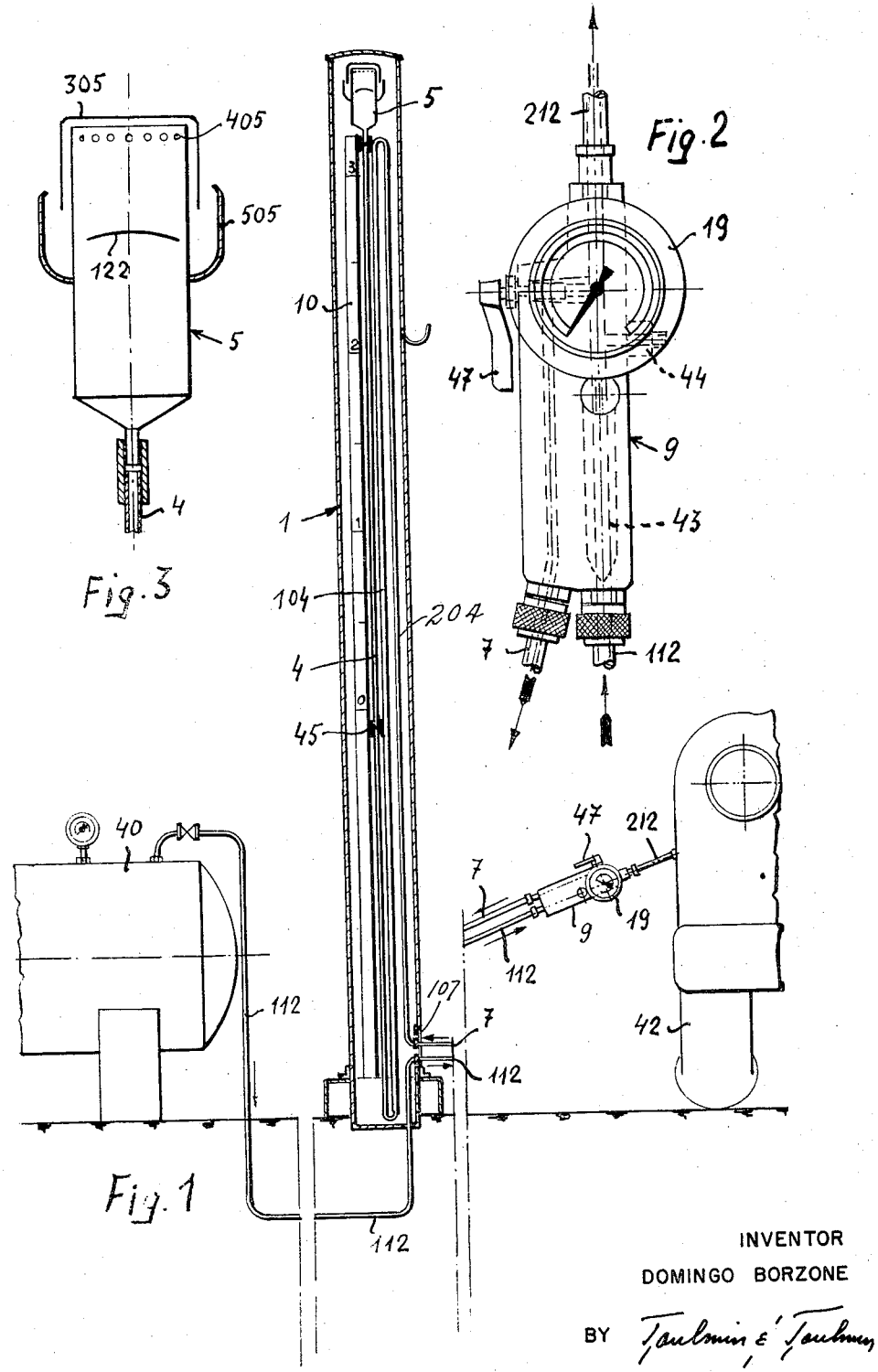

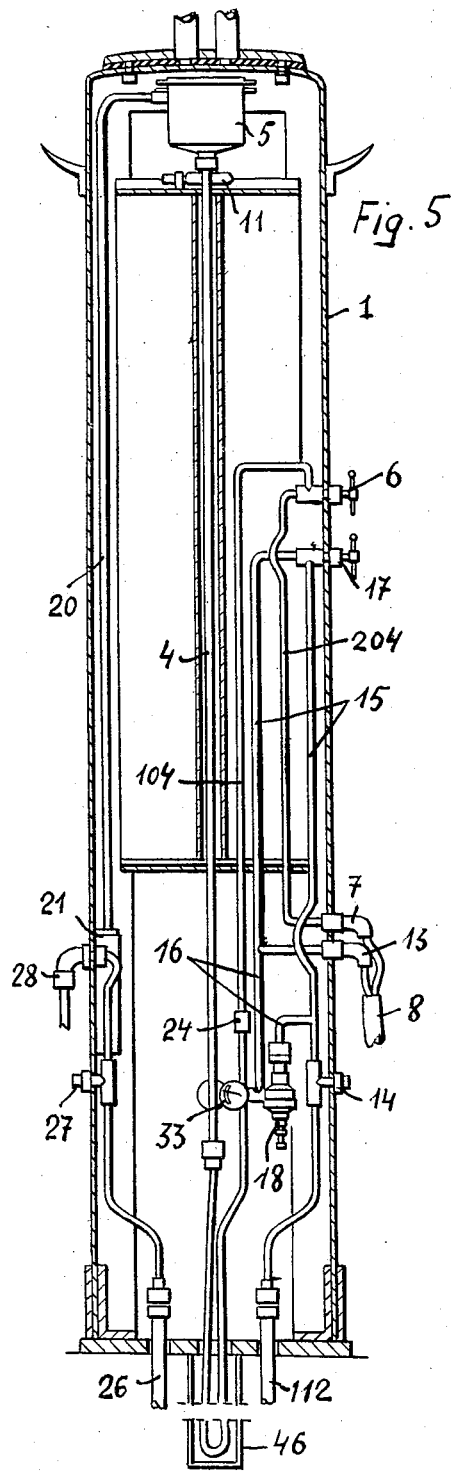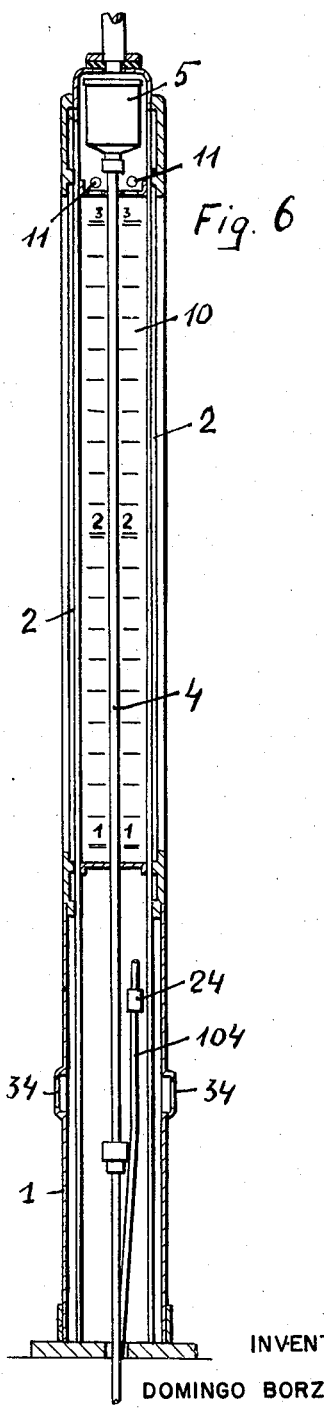

2,854,019

APPARATUS FOR CONTROLLING THE INFLATION OF MOTOR VEHICLE TIRES AT SERVICE STATIONS

Domingo Borzone, Genoa, Italy

Application November 15, 1954, Serial No. 468,871

7 Claims. (Cl. 137—229)

This invention relates to the apparatus for controlling the inflation of motor vehicle tires at service stations.

In the known apparatus the inflation of the tires is controlled usually by means of a single mechanical pressure gauge which is fitted on a pistol-like control member provided with at least one distributing valve and inserted in the compressed air feed hose to be connected to the tire valve. Mechanical pressure gauges such as have been used are liable to get frequently out of order however and consequently their readings can not be relied upon.

In order to overcome this drawback, it has been proposed to adopt liquid column pressure gauges, the liquid usually used being mercury, in which the measuring branch of the gauge is closed at its end and filled with gas under pressure. These gauges are however quite difficult to read as the back pressure of the entrapped gas above the liquid column varies considerably with variation of the temperature.

On the other hand, the usual open-ended mercury gauges suitable for pressures of the order of 14 to 43 pounds per square inch are of such a height as to make it difficult to take readings especially of the higher pressures.

The improved apparatus according to the invention has for its general object to eliminate the above drawbacks by using in combination two pressure gauges, one fixed gauge being of an improved open-ended mercury column type, partially fitted in an excavation or pit and the other being of handy mechanical type fitted preferably on the pistol. The pistol, in its turn is provided with a cock or valve permitting of the inserting of both pressure gauges in parallel with the pressure line or of excluding either of them at will.

According to a preferred embodiment of the invention the open-ended mercury gauge is of the syphon type, partially inserted in said pit and, in order to permit the reading of the lower pressures, in the gauge tube branch which gives the pressure indications on the mercury column a suitably high column of light colored liquid (oil) is provided, while the top of the gauge tube terminates in an overflow cup, which serves also as an overflow container for the mercury, if the maximum pressure, for which the gauge is built, is surpassed.

Other characteristic features of the invention are a particular construction of the overflow cup and the attached part, in order to avoid mercury losses, in case the mercury should be projected out of the gauge tube as a result of a sudden excess pressure, the particular piping and valve arrangement for permitting an easy and reliable operation of the apparatus, means for enabling the mercury gauge to be read from a number of positions and other characteristic features as will be apparent from the following description of some preferred embodiments shown by way of non-limiting example in the annexed drawings in which:

Figure 1 represents an embodiment of the whole apparatus in elevation with the mercury gauge in section.

Figure 2 shows schematically the pistol inserted on the pipe to be connected to the tire, and Figure 3 is a vertical section, in enlarged scale, of the overflow cup of the mercury gauge fitted at the top of the mercury gauge shown in Figure 1.

Figures 5 and 6 are two vertical perpendicular sections of the same gauge.

Figure 7 is a cross section through the mercury gauge and attached parts shown in Figure 4.

Figure 8 shows a vertical section of the modified form of the mercury overflow cup, and Figure 9 is a section through the mercury column stabiliser valve.

Figure 4:
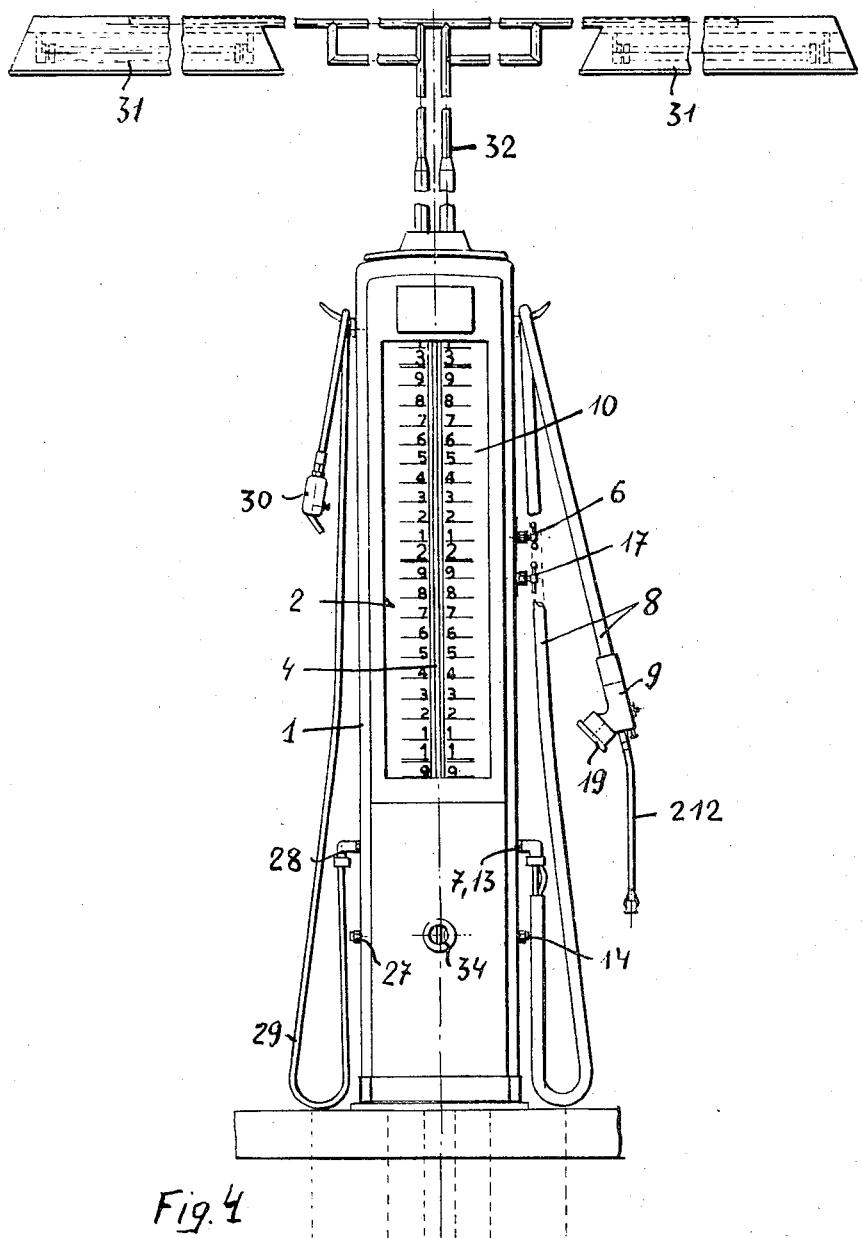
Figure 4 is a front elevation of the pressure gauge.

Referring to Figures 1 to 3 of the drawings, a compressed air tank 40 is adapted to be connected by means of pipe 112 and pistol 9 to a tire 42 to be inflated. Pistol 9 (Figure 2) is connected to the compressed air feed pipe 112 through any suitable valve, such as a control valve 43 and is provided with a discharge valve 44 and a mechanical pressure gauge 19. The pressure chamber of this latter may be connected through a cock, controlled by lever 47, and through hose 7 to a mercury column gauge indicated generally at 1.

In the embodiment shown, the mercury gauge is of the open-ended syphon type housed within a hollow column 101. The mercury gauge comprises an arrangement of open-ended U-shaped upright tubes 4 and 104 whose indicating branch 4 is provided at its end with an overflow cup 5 while the end of its other branch 104 is connected through pipe 204 to a nipple 107. The mercury level, in the rest position of the gauge, reaches in both branches a position 45, slightly below half of the height of both tube branches. If however in branch 4, above the mercury column a small oil column is provided, in order to permit easy reading at the lower pressures, particularly when the lower part of the gauge is housed in a pit, as will be better seen hereinafter, the level of the column in branch 4 is higher than that in branch 104.

The reading of the pressures is effected on a graduated scale 10, which may be double in case an oil column is formed on the mercury column in branch 4.

The operation of the above-described apparatus is as follows: The inflation of the tires takes place usually while the mechanical gauge 19 fitted on the pistol 9 is inserted, and the readings of which can be compared, continuously or at intervals, by means of the mercury gauge 1. For this purpose this latter is put into communication with the pressure chamber of gauge 19 by operating the cock lever 47. Thus possible derangements and locking of the gauge 19 may be promptly detected and eliminated.

In order to limit the height of the mercury gauge, this is used only for lower pressures of say 14 to 43 pounds per square inch such as are applicable to small and medium size cars.

In the second embodiment shown in Figures 4 to 7, a hollow column 101 is of substantially prismatic shape and provided on two opposite sides with wide vertical apertures 2 which are closed by transparent plates 3. The mercury gauge within the column 101 comprises a U-tube having a pressure branch 104 adapted to be connected to a compressed air pipe and an indicating branch 4 opening to the atmosphere. In order to reduce the gauge height above the floor level, its lower part is fitted in a shallow excavation or pit 46 (see Figure 4). The indicating branch 4 of the gauge extends axially along the column 101 and opens at its top into a cup 5 while the pressure branch 104 of this gauge is connected to the pistol 9, which is connected to the tire by means of the cock 6, the pipe 204, the fitting 7 outside the column 101, and the twin hose 8 attached to fittings 7 and 13.

The reading of the mercury gauge is effected on a graduated scale 10 attached within the column 101 adjacent the indicating branch 4 of the gauge. In its preferred embodiment shown in Figures 4 to 7, the scale 10 is inscribed on four vertical wings 110, 210, 310 and 410 which are inclined with respect to the apertured sides of column 101, being arranged, for example, substantially diagonally of the cross section of the column 101 and extending close to the indicating gauge branch 4 (see Figures 4 and 7). Thus an easy reading is permitted from two opposite sides of the column 101, even by persons looking obliquely with regard to the planes of said column sides. This arrangement also permits good illumination of the indicating branch of the gauge and of the scales, for example by means of a pair of lamps 11 arranged at the inside of the column, at the top thereof, as shown in Figures 5 and 6.

The compressed air feed pipe 112 coming from a tank or from a compressor opens into the interior of the column and is connected to the pistol 9 by means of outer nipple 13 and twin hose 8 through stop cock 14 and through two parallel branch pipes 15 and 16, branch 15 being provided with a stop cock 17 fitted at the exterior and the other branch 16 being provided with a pressure reducer 18.

The construction of pistol 9, which carries the mechanical gauge 19, may be conventional and must be adapted to connect the tire to be inflated, or whose pressure is to be controlled, into communication with both pressure gauges, the mercury gauges 4 or 104 respectively, and the mechanical gauge 19, and/or with the compressed air feed pipe 112. When used in connection with low-pressure tires, cock 17 is closed and cock 6 of the mercury gauge is opened. The compressed air passes through feed pipe branch 16 and pressure reducer 18 when the pressure is reduced from 142 to about 43 pounds per square inch which pressure may be read both on the mechanical gauge 19, and on the mercury column gauge 4—104. In the case of lorry tires, which are usually inflated at about 85–100 pounds per square inch the cock 17 is opened and thus the whole compressor pressure is sent into the pistol. In this case, in order to prevent the mercury from being projected out of the gauge tube 4, it is necessary previously to shut the cock 6, thus excluding the mercury gauge. The pressure is read in this case only on the mechanical gauge 19.

In order to prevent the mercury in the mercury gauge from being accidentally blown away when subjected to higher pressures than those for which it is constructed, an overflow cup 5 is provided on the top of the indicating branch of the mercury gauge.

In the embodiment shown in Figures 1 and 3 this overflow cup is closed and presents near its top side openings 405 and has in its interior a concave baffle plate 122. Furthermore on the cup 5 a cap 305 is loosely fitted and there is also a circular gutter 505 in which the mercury projected out of the openings 405 may be collected.

In the embodiment shown in Figures 5, 6 and 8, the cup 5 is tightly closed at its top by cover 105 and communicates with the atmosphere through a side fitting 205 connected to a descending tube 20 opening at its lower end into a container 21. Within the cup 5 a reversed cup-shaped baffle 22 is fitted and the gauge branch 4 is fitted at its end into a sleeve 23 which extends almost to the baffle 22 and is provided with side openings 123 substantially level with the cup bottom. In this manner the mercury which is expelled out of the gauge tube and projected against the baffle 22 falls into the underlying cup 5 from which it flows back into the tube 4 through openings 123. Mercury particles entrained by the air current through the slit between baffle 22 and cup 5 are collected into container 21.

A further improvement in the mercury gauge employed with the invention resides in the provision of a valve 24 inserted in the pressure branch 104 of the mercury gauge, and adapted to damp the oscillations of the mercury column in the gauge branch 4 promoted by sudden increases or decreases of the pressure to be measured. This stabilizer valve 24 is constructed so as to considerably choke automatically the passage area of pipes 104 and 204 as a consequence of the same variations of pressure in said pipes, in either direction viz. during the ascent or descent of the mercury within gauge tube 4, while this valve tends to open the whole passage area of pipe 104—204 when equilibrium is reached within the two branches of the mercury gauge. For this purpose the valve 24 is designed preferably as a double-acting non-return valve having a movable valve member, such as a ball or, as shown, a double-mushroom-shaped closure member shiftable with some play between two opposite seats, against which it may alternatively bear, by the differences in pressure on its opposite sides, without however effecting a tight closure (Figure 9).

The column 101 may also serve as supporting member for a water hose 29 provided with a conventional nozzle 30 and for a lamp post 32 which supports a pair of bracket lamps 31. The mercury level within U-tube 4 or 104, in the non-working position of the manometer, as well as the pressure gauge 33 of the pressure reducer 18 may be controlled from the exterior through two inspection holes 34.

Of course the invention is not limited to the embodiments as shown but may undergo wide variations and modifications especially as regards the constructive embodiment of the inflating pistol and of the mechanical pressure gauge mounted thereon as well as of the mercury column control gauge, without departing from the scope of the invention as defined in the appended claims.

What I claim is:

1. An inflation apparatus for indicating and controlling the supply of air from a source to low-pressure tires and to high pressure tires, a pistol-like chuck having a mechanical pressure indicating gauge mounted thereon, a first passage in said chuck having an inlet to receive air under pressure and an outlet for exhausting said air under pressure, a second passage having an inlet in communication with said first passage between the inlet and outlet thereof and an outlet for said second passage, manually operable valve means in said gauge for controlling flow between said passages, the said mechanical pressure gauge mounted on said chuck being in communication with said valve means for indicating a wide range of pressures, an open-top U-tube mercury gauge having graduations on one leg for indicating a relatively low pressure range corresponding to the initial portion of the said wide pressure range of the mechanical gauge, a conduit connecting the open end of the other leg of the U-tube with the second passage of said mechanical gauge, and manually actuated valve means in said conduit for closing communication between said mercury gauge and said mechanical gauge at will.

2. An apparatus according to claim 1, wherein said mercury gauge further comprises an overflow cup having lateral openings in the cup wall, said indicating leg of said mercury gauge opening into said cup, a baffle member disposed in said cup in such a manner as to avoid a projection of the mercury out of the cup, when excessive pressures are applied to the mercury gauge; an annular gutter being disposed around said cup, a cap being provided with said cup, said cap intercepting the free communication with said lateral openings and conducting any mercury projected through said openings into said gutter.

3. An apparatus according to claim 1, further comprising two parallel branch pipes for connecting said source of air to said pistol-like chuck, a stop cock being provided in one of said branch pipes, said cock being adapted for connecting said pistol-like chuck directly to said source of air; and a pressure reducing means being inserted in said other branch pipe.

4. A device as described in claim 1, further comprising a hollow column and two parallel branch pipes in said column for connecting said source of air to said pistol-like chuck, a pressure reducing means in one of said branch pipes, and valve means disposed in said hollow column for connecting at will either of said branch pipes.

5. An apparatus according to claim 1, in which said apparatus comprises two parallel branch pipes for connecting said source of air to said pistol-like chuck; a stop cock being provided with one of said branch pipes and adapted for connecting said pistol-like chuck directly to said source of air; a pressure reducing means being inserted in said other branch pipe; said stop cock means being a single multiple cock provided with a single control member and adapted to exclude the mercury gauge when the source is directly connected to the pistol-like chuck and vice versa.

6. A device as described in claim 1, in which said apparatus comprises two parallel branch pipes for connecting said source of air to said pistol-like chuck, a stop cock being provided in one of said branch pipes and destined for connecting said pistol-like chuck directly to said source of air; a pressure reducing valve being inserted in said other branch; said valve means comprising a single multiple cock provided with a single control member and adapted to exclude the mercury gauge when the source of air is directly connected to said pistol means, and vice versa; a valve inserted in said conduit means connecting said pistol-like chuck to said mercury gauge for damping the oscillations of the mercury column, said damping valve being constructed so as to substantially and automatically choke the passage area of said conduit means by action of the same pressure variations during the ascent as well as the descent of the mercury column within the gauge tube while said damping valve tends to open that passage when the equilibrium of pressure within the two mercury gauge tube branches is attained.

7. An apparatus according to claim 1 wherein said mercury gauge further comprises an overflow cup having a lateral opening in the cup wall, said indicating leg of said mercury gauge opening into said cup, a descending pipe, a container, the said cup being closed at its top, a side fitting being provided in the lateral opening of said cup, the said fitting being connected to said descending pipe terminating in said container, a shallow reversed cup-shaped baffle being provided in said cup, a sleeve extending under said baffle and fitted on the end of the indicating gauge branch, said sleeve being provided with apertures substantially level with the bottom of said cup.

References Cited in the file of this patent

UNITED STATES PATENTS

| | | |
|---|---|---|
| 1,848,233 | Swope et al. | Mar. 8, 1932 |
| 2,052,116 | Strauss | Aug. 25, 1936 |
| 2,057,889 | Fagan | Oct. 20, 1936 |
| 2,105,967 | Burdsal | Jan. 18, 1938 |
| 2,111,221 | Mitchell | Mar. 15, 1938 |
| 2,173,619 | Ames | Sept. 19, 1939 |

FOREIGN PATENTS

| | | |
|---|---|---|
| 554,522 | Great Britain | July 7, 1943 |
| 817,969 | Germany | Oct. 22, 1951 |